Patented Dec. 27, 1927.

1,654,099

UNITED STATES PATENT OFFICE.

TSUNEJI SHIRAISHI, OF TATSUTA VILLAGE, MIYE, JAPAN.

COLLOIDAL CALCIUM CARBONATE AND METHOD OF PRODUCING THE SAME.

No Drawing. Application filed August 3, 1926, Serial No. 126,923, and in Japan December 25, 1924.

The present invention relates to a process of producing colloidal calcium carbonate and more especially to the manufacture of novel products of calcium carbonate in colloidal state characterized by the feature that milk of lime, prepared by adding water to calcined calcium oxide is treated with carbon di-oxide gas at substantially low temperatures such as below 15° C. by either rapidly removing the heat generated due to the reaction by external means or by regulating the pressure and rate of introduction of carbon dioxide into the milk of lime.

The object of my invention is to prepare a novel product of calcium carbonate which can be used extensively for industrial purposes and also as pharmaceutical or health-promoting agents at lower cost and in an effective manner.

It is well known that if milk of lime is acted on by carbon di-oxide gas under ordinary conditions heat is generated owing to the chemical reaction and if it is left alone and the reaction is completed under normal conditions then the product is ordinary calcium carbonate having a crystalline nature and other well known physical properties.

I have found out by several hundreds of experiments that in putting carbon di-oxide in contact with milk of lime if a particular selection is made in the operating temperature, the density or specific gravity of the milk of lime, the proportion of $CO_2$ gas and also the contact condition, a novel substance which is quite different from ordinary calcium carbonate both in physical and chemical properties can be obtained. Such substance consists of colloidal calcium carbonate having very fine particles, such for instance, as from one tenth of one thousandth to several hundredths of one thousandth of a millimeter according to the controlled conditions, and belongs to a pure colloidal calcium carbonate. This novel substance keeps its colloidal state in water only and is a white paste having adhesive power, mouldability and contracting properties, quite different from those of ordinary calcium carbonate. The product obtained by my invention as already stated is a special calcium carbonate in colloidal form, which has never been disclosed before my invention as far as I am aware.

In carrying my invention into effect I first prepare a solution of milk of lime from fresh calcined calcium oxide. The fresh calcined calcium oxide reacts with water very slowly. The fresh milk of lime solution is then treated with carbon dioxide gas under controlled conditions. According to my invention I keep the heat generated by the reaction below a predetermined temperature by adsorbing it such as for instance by cooling water pipes arranged in solution. The temperature of reaction should substantially be kept below 15° C., the lower the temperature is the better the product will be and the percent of carbon dioxide in the gas will affect the character of the colloidal calcium carbonate obtained.

According to another embodiment of my invention a similar result can be obtained by suitably regulating the density of milk of lime at a desired temperature below the atmospheric temperature without taking away the heat generated by the reaction by external cooling means as before. The desired result can be obtained by using dilute milk of lime such as lying between 1 degree to 5 degrees Baumé and by carrying out the reaction as quick as possible and removing the product as soon as it is produced. In this case the solution may be agitated by a rapidly rotating agitator in an enclosed chamber into which $CO_2$ gas is passed to effect more rapid contact reaction, and the liquid and gas may be passed relatively through a continuous operating device. The reason why the desired product can be obtained in this case without taking away the heat of reaction by external cooling means is probably due to the fact that the excess water of the milk of lime will absorb the generated heat by itself and carry it away so rapidly that there is no raising of the temperature. Thus the reaction can be always effected below the predetermined temperature.

I have also found out that the colloidal calcium carbonate can be produced without using mechanical heat absorbing means and with milk of lime having a different specific gravity than that specified in the former examples by regulating the pressure and proportion of gas and contact condition. In other words, I have found out that the desired object can be attained by using milk of lime at a density of 5 degrees to 10 degrees Baumé and at a suitable temperature below atmospheric temperature and by regulating the proportion of gas and contact condition. The $CO_2$ gas should be substantially dilute and have lower pressure, such for instance, as a gas mixture containing about 30% or less of $CO_2$ and the rest being an inert gas such as nitrogen and oxygen. In order to obtain desired contact operation with low pressure gas the milk of lime should be supplied as a thin layer or thin film and the gas is sent through the layer or film at low pressure. It may be carried out for instance by some means having several layers of wire gauze arranged at the bottom of a weir upon which the dense solution of milk of lime is passed while the gas is supplied from below the wire gauze so that the liquid is prevented by the gas from dropping out through the net, since the surface tension of dense milk of lime when spread over the wire net is sufficiently high to support itself giving wider surface of contact and slow and effective reaction, and thus the colloidal calcium carbonate can be produced.

The colloidal calcium carbonate obtained by the present invention as stated in the foregoing examples can not maintain its colloidal state unless it is kept in water and if it is dried it will lose its effective properties according to my invention. Such colloidal calcium carbonate in the state of water is very inconvenient for packing and transportation. I have obtained a satisfactory result in drying it up without losing colloidability if some gelatinous substance is added to it and then dried. The above dried substance preserves the original nature and it recovers again the colloidal state if treated with water. This is one of the most important characteristics in practice, as the solid or powdered substance is very convenient in handling and for storing up. The auxiliary agents which I have found at present most suitable for carrying out my invention are glue, gelatin, casein, gum arabic, tragacanth, agar-agar, cognac, carrageen, soluble starch and other similar gelatinous organic matters, gelatin may be added in about 10 to 30% to the colloidal calcium carbonate and the mixture dried, then the product will maintain its colloidability and may be returned to its original state when mixed with water. I believe that the above mentioned gelatinous auxiliary agents can be well associated with very fine particles of colloidal calcium carbonate and prevent the crystal separation as it is dried up so that the colloidability is safely preserved.

The gelatinous substances above enumerated act as protective colloids, preventing crystallization of the calcium carbonate, and in the appended claims, by the term "protective colloid" I mean to include such substances as glue, gelatin, casein, gum arabic, tragacanth, agar-agar, soluble starch, etc.

While I have, in accordance with the patent statute, described my invention with several embodiments thereof, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. The process of preparing colloidal calcium carbonate which comprises treating freshly prepared milk of lime with carbon dioxide gas at a temperature not greater than 15° C., adding a protective colloid to the so prepared colloidal calcium carbonate solution and thereafter evaporating the water.

2. The process of preparing colloidal calcium carbonate which comprises treating freshly prepared milk of lime having a Baumé gravity of not more than 10° with carbon dioxide gas at a temperature not greater than 15° C., adding a protective colloid to the so prepared colloidal calcium carbonate solution and thereafter evaporating the water.

3. The process of preparing colloidal calcium carbonate which comprises treating freshly prepared milk of lime having a Baumé gravity of about 5 to 10°, with carbon dioxide gas at a temperature not greater than 15° C., adding a protective colloid to the so prepared colloidal calcium carbonate solution and thereafter evaporating the water.

4. The process of preparing colloidal calcium carbonate which comprises treating freshly prepared milk of lime with carbon dioxide gas at a temperature not greater than 15° C. and at low pressure, adding a protective colloid to the so prepared colloidal calcium carbonate solution and thereafter evaporating the water.

5. The process of preparing colloidal calcium carbonate which comprises treating freshly prepared milk of lime with carbon dioxide gas mixture having a carbon dioxide concentration of about 30% and at a temperature not greater than 15° C., adding a protective colloid to the so prepared colloidal calcium carbonate solution and thereafter evaporating the water.

6. In the process of preparing colloidal calcium carbonate, the step which comprises treating milk of lime with carbon dioxide gas at temperatures below 15° C.

7. In the process of preparing colloidal calcium carbonate, the step which comprises treating milk of lime with carbon dioxide gas at temperatures below 15° C., the milk of lime having a concentration of not more than 10° Baumé.

8. As a new product, a dry colloidal calcium carbonate containing a protective colloid and capable of forming colloidal calcium carbonate solutions when treated with water.

9. As a new product, a dry colloidal calcium carbonate containing 10 to 30% of a protective colloid and capable of forming colloidal calcium carbonate solutions when treated with water.

In witness whereof, I have hereunto set my hand this 7th day of May, 1926.

TSUNEJI SHIRAISHI.